(12) United States Patent
Haskins et al.

(10) Patent No.: US 9,567,093 B2
(45) Date of Patent: Feb. 14, 2017

(54) TIME DOMAIN REFLECTOMETRY AIRCRAFT FUEL GAUGE

(71) Applicant: AIRBUS OPERATIONS LIMITED, Bristol (GB)

(72) Inventors: Richard Haskins, Bristol (GB); Joseph K-W Lam, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 14/442,966

(22) PCT Filed: Nov. 6, 2013

(86) PCT No.: PCT/GB2013/052896
§ 371 (c)(1),
(2) Date: May 14, 2015

(87) PCT Pub. No.: WO2014/076455
PCT Pub. Date: May 22, 2014

(65) Prior Publication Data
US 2015/0307200 A1 Oct. 29, 2015

(30) Foreign Application Priority Data

Nov. 16, 2012 (GB) .................................. 1220658.7

(51) Int. Cl.
*B64D 37/02* (2006.01)
*B64D 37/04* (2006.01)
(Continued)

(52) U.S. Cl.
CPC ............. *B64D 37/005* (2013.01); *B64D 37/00* (2013.01); *B64D 37/04* (2013.01); *G01F 22/00* (2013.01); *G01F 23/284* (2013.01); *G01F 23/292* (2013.01)

(58) Field of Classification Search
None
See application file for complete search history.

(56) References Cited

U.S. PATENT DOCUMENTS

| 5,910,188 A * | 6/1999 | Resnick ................ G01F 23/284 |
| | | 73/290 R |
| 6,121,780 A | 9/2000 | Cruickshank et al. |

(Continued)

FOREIGN PATENT DOCUMENTS

| DE | 102005015548 A1 | 10/2006 |
| DE | 102008031439 A1 | 11/2009 |

(Continued)

OTHER PUBLICATIONS

International Search Report and Written Opinion mailed Feb. 26, 2014 in International Application No. PCT/GB2013/052896 filed Nov. 6, 2013.

(Continued)

*Primary Examiner* — Richard G Davis
(74) *Attorney, Agent, or Firm* — Hauptman Ham, LLP (57) ABSTRACT

An aircraft fuel tank system comprising an aircraft fuel tank and a time domain reflectometry (TDR) fuel gauge for measuring a filling level of fuel in the aircraft fuel tank. The TDR fuel gauge comprises an electromagnetic signal generator and a cable, the cable comprising a first cable part and a second cable part which are coupled in series to the signal generator. The first cable part extends downwardly within the fuel tank and the second cable part extends upwardly within the fuel tank. The first and second cable parts are arranged such that for at least one filling level the first cable part extends down into the fuel from an ullage space at a first location and the second cable part extends up out of the fuel into an ullage space at a second location which is spaced apart from the first location.

20 Claims, 9 Drawing Sheets

(51) Int. Cl.
*B64D 37/12* (2006.01)
*B64D 37/00* (2006.01)
*G01F 23/284* (2006.01)
*G01F 23/292* (2006.01)
*G01F 22/00* (2006.01)

(56) References Cited

U.S. PATENT DOCUMENTS

| | | | | |
|---|---|---|---|---|
| 6,452,467 | B1* | 9/2002 | McEwan | G01S 7/02 |
| | | | | 333/240 |
| 6,801,678 | B2* | 10/2004 | Murshid | G01F 23/292 |
| | | | | 250/227.14 |
| 2009/0076744 | A1* | 3/2009 | Anderson | G01F 23/292 |
| | | | | 702/55 |
| 2009/0249870 | A1 | 10/2009 | Volpe et al. | |
| 2010/0281972 | A1 | 11/2010 | Krammer | |
| 2011/0246100 | A1 | 10/2011 | Carvalho et al. | |

FOREIGN PATENT DOCUMENTS

| | | |
|---|---|---|
| EP | 2154495 A1 | 2/2010 |
| GB | 2184229 A | 6/1987 |
| WO | 98/05931 A1 | 2/1998 |
| WO | 98/24013 A2 | 6/1998 |
| WO | 01/63219 A2 | 8/2001 |

OTHER PUBLICATIONS

United Kingdom Intellectual Property Office Search Report dated Dec. 6, 2012 in corresponding Great Britian Application No. 1220658.7 filed Nov. 16, 2012.

* cited by examiner

TIME DOMAIN REFLECTOMETRY AIRCRAFT FUEL GAUGE

RELATED APPLICATIONS

The present application is a National Phase of International Application Number PCT/GB2013/052896, filed Nov. 6, 2013, which claims priority to Great Britain Application Number 1220658.7, filed Nov. 16, 2012.

FIELD OF THE INVENTION

The present invention relates to a time domain reflectometry (TDR) fuel gauge for measuring a filling level of fuel in an aircraft fuel tank.

BACKGROUND OF THE INVENTION

In conventional aircraft fuel gauging systems, dozens of capacitance based probes are used across the wing. The large number of probes results in a high weight penalty and high installation cost.

SUMMARY OF THE INVENTION

A first aspect of the invention provides an aircraft fuel tank system comprising an aircraft fuel tank; and a time domain reflectometry (TDR) fuel gauge for measuring a filling level of fuel in the aircraft fuel tank, the TDR fuel gauge comprising an electromagnetic signal generator and a cable, the cable comprising a first cable part and a second cable part which are coupled in series to the signal generator, wherein the first cable part extends downwardly within the fuel tank and the second cable part extends upwardly within the fuel tank, and wherein the first and second cable parts are arranged such that for at least one filling level of the fuel in the fuel tank the first cable part extends down into the fuel from an ullage space at a first location and the second cable part extends up out of the fuel into an ullage space at a second location which is spaced apart from the first location. The signal generator is arranged to transmit an electromagnetic input pulse into the cable, and the fuel gauge is arranged to receive and process a first reflected electromagnetic pulse from the first cable part where it extends down into the fuel and a second reflected electromagnetic pulse from the second cable part where it extends up out of the fuel.

A second aspect of the invention provides a method of measuring a filling level of fuel in an aircraft fuel tank with a time domain reflectometry (TDR) fuel gauge, the TDR fuel gauge comprising a signal generator and a cable, the cable comprising a first cable part and a second cable part which are coupled in series to the signal generator, the method comprising transmitting an electromagnetic input pulse from the signal generator into the cable; receiving a first reflected electromagnetic pulse from the first cable part where it extends down into the fuel from an ullage space at a first location; and receiving a second reflected electromagnetic pulse from the second cable part where it extends up out of the fuel into an ullage space at a second location, and determining a time of receipt of the first and second reflected pulses.

The present invention provides a fuel gauging system which enables two independent fuel level measurements to be made by a single fuel gauge, each measurement associated with a time of receipt of a respective one of the reflected pulses. This provides redundancy, and optionally an average of the two fuel level measurements can be used to provide a more accurate overall estimate of the fuel level.

Preferably the times of receipt of the first and second reflected pulses are used to determine two independent fuel level measurements. Optionally the times of receipt of the first and second reflected pulses may be used to determine a volume of the fuel in the fuel tank. In this case the times of receipt of the first and second reflected pulses are typically used in combination with other data from attitude sensors, and/or other fuel level measurements from other gauges, and/or other fuel level measurements from the same gauge in order to determine the volume of fuel.

In the preferred embodiments described below the fuel gauge can only generate a maximum of two fuel level measurements for each filling level, but the cable could undulate to provide further serially connected cable parts which pass through a fuel/ullage transition to give further measurements.

The first and second reflected electromagnetic pulses may be received in any order, depending on whether the first or second cable part is further along the cable from the signal generator.

The first and second cable parts typically pass from/into the same ullage space, although for a complex fuel tank geometry they may pass from/into two distinct ullage spaces.

For the at least one filling level the first cable part may extend at an acute angle to the horizontal (for instance between 5 degrees and 40 degrees to the horizontal) at the first location where it extends down into the fuel and/or the second cable part may extend at an acute angle to the horizontal (typically between 5 degrees and 40 degrees to the horizontal) at the second location where it extends up out of the fuel. Alternatively the first and/or second cable parts may extend vertically where they extend in or out of the fuel.

The cable may be suspended within the tank without being mounted to the walls of the fuel tank, but more preferably the first cable part is mounted to a first wall of the fuel tank and the second cable part is mounted to a second wall of the fuel tank. The first and second walls may be opposite or adjacent. In the case of adjacent walls then the cable parts typically meet at a corner which may be a high or low point of the tank.

Typically the cable further comprises a third cable part in series with the signal generator and the first and second cable parts of the cable; the fuel tank has two opposite side walls and an upper or lower wall extending between the side walls; and the three cable parts are attached to the two opposite side walls and to the upper or lower wall. This enables the cable to extend over virtually the full horizontal dimension of the tank and enables the TDR gauge to take readings from locations which are widely spaced apart.

Optionally the cable further comprises third and fourth cable parts in series with the signal generator and the first and second cable parts of the cable; wherein the fuel tank has two opposite side walls and upper and lower walls extending between the side walls; and the four cable parts are attached to the two opposite side walls and to the upper and lower walls. Arranging the cable in a loop in such a way enables the gauge to measure a wide range of filling levels.

The fuel tank may have a low point and a high point which are spaced apart horizontally. A wide range of filling levels of such a fuel tank cannot be measured by a single vertically extending gauge, so the invention provides a means of measuring a wide range of filling levels in such a tank with a single gauge.

For a simple tank geometry, both cable parts may pass through a fuel/ullage transition for most (or all) filling levels. Alternatively there may be a second filling level of the fuel in the fuel tank which is higher than the first filling level and in which the first cable part is fully immersed in the fuel so it does not pass through a fuel/ullage transition. In such a case preferably the second cable part extends up out of the fuel into an ullage space and the second filling level is measured by receiving a reflected electromagnetic pulse from the second cable part where it extends up out of the fuel and determining a time of receipt of the reflected electromagnetic pulse.

Typically at least part of the cable (which may be the first or second part) extends at least partially horizontally within the fuel tank, optionally also with an element of vertical extension so the cable extends at an acute angle to the horizontal.

Preferably at least part of the cable runs along a lower wall of the fuel tank.

The fuel tank typically has a vertical depth and a horizontal dimension (for instance width or length) and the cable extends across more than 70% of the horizontal dimension of the fuel tank (preferably more than more than 80% and most preferably more than 90%). This enables the TDR gauge to take readings from locations which are widely spaced apart within the fuel tank.

The fuel system is typically part of a vehicle such as an aircraft. In the case of an aircraft the fuel tank may be a wing tank in a wing of the aircraft, or a centre tank of the aircraft.

In the case of a wing tank, preferably at least part of the cable extends away from a plane of symmetry of the aircraft. The cable and the wing tank each have a span normal to the plane of symmetry and typically the span of the cable is more than 70% of the span of the wing tank, preferably more than more than 80% of the span of the wing tank and most preferably more than 90% of the span of the wing tank.

Typically the wing tank along with the first and/or second cable part is angled upwardly (in the case of a dihedral wing) or downwardly (in the case of an anhedral wing) as it extends away from the plane of symmetry along the span of the wing. Thus the angled first and/or second cable part can provide a fuel level measurement for a large range of filling levels, in contrast with conventional systems which require a large number of sensors spread apart along the span of the wing.

Typically the fuel tank has a forward wall and an aft wall, relative to the forward motion of the aircraft, and each TDR fuel gauge passes through the forward wall or the aft wall.

A further reflected electromagnetic pulse may be received from the cable where it passes through a transition between water and fuel. The fuel gauge in this case may generate an output which indicates the presence of water in response to receipt of the further reflected electromagnetic pulse, and/or it may determine a water level in accordance with a time of receipt of the further reflected electromagnetic pulse.

The cable may be an optical-fibre cable (for the case in which the electromagnetic pulses are optical pulses) or it may be an electrically conductive cable (for other wavelengths in the electromagnetic spectrum, such as microwaves).

The fuel tank may have one more TDR fuel gauges which collectively generate three or more fuel level measurements which define a surface which will depend on a volume of fuel in the tank as well as a pitch and roll of the tank relative to the horizontal. The system typically further comprises a processor arrange to estimate the volume of fuel in the tank in accordance with the three or more fuel level measurements.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
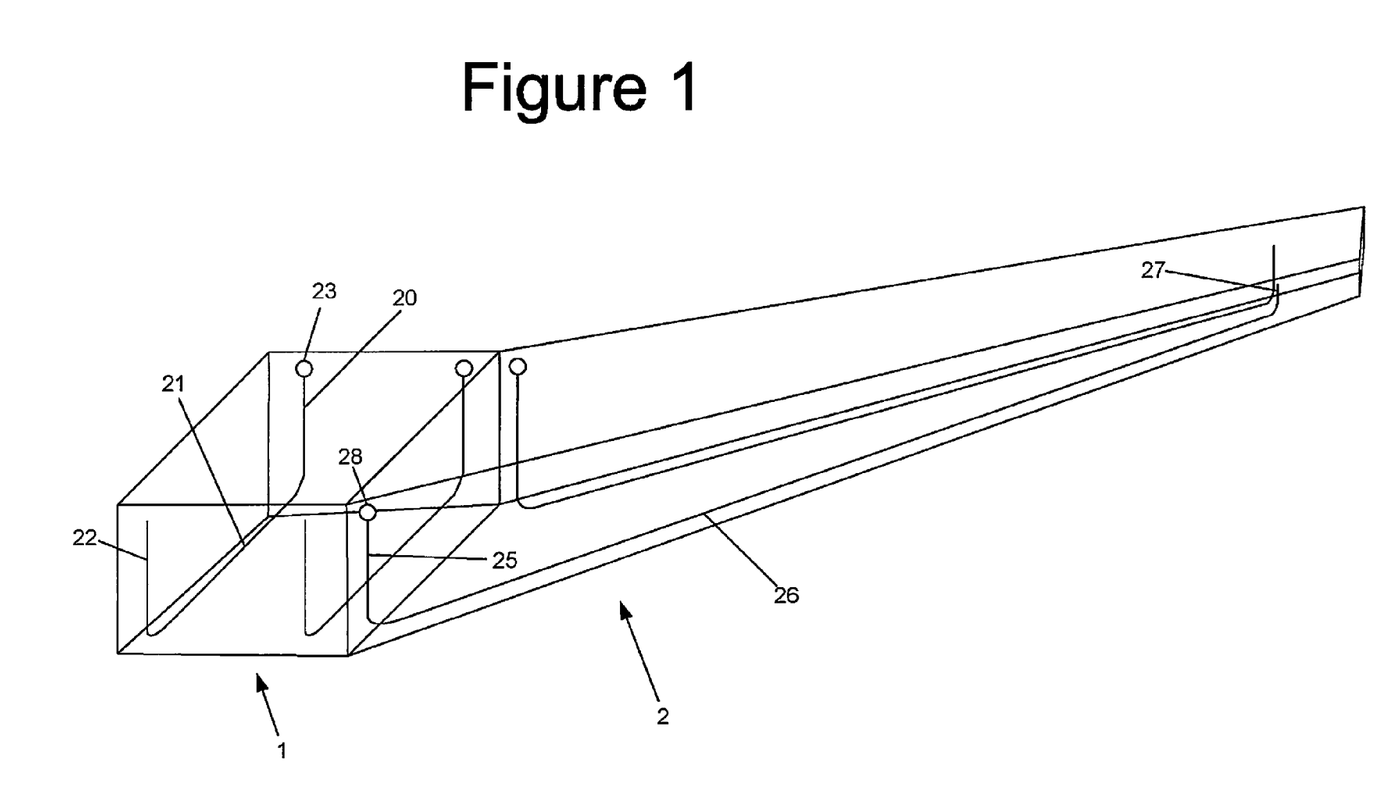
FIG. 1 is an isometric view of a first fuel tank system.
Figure 2:
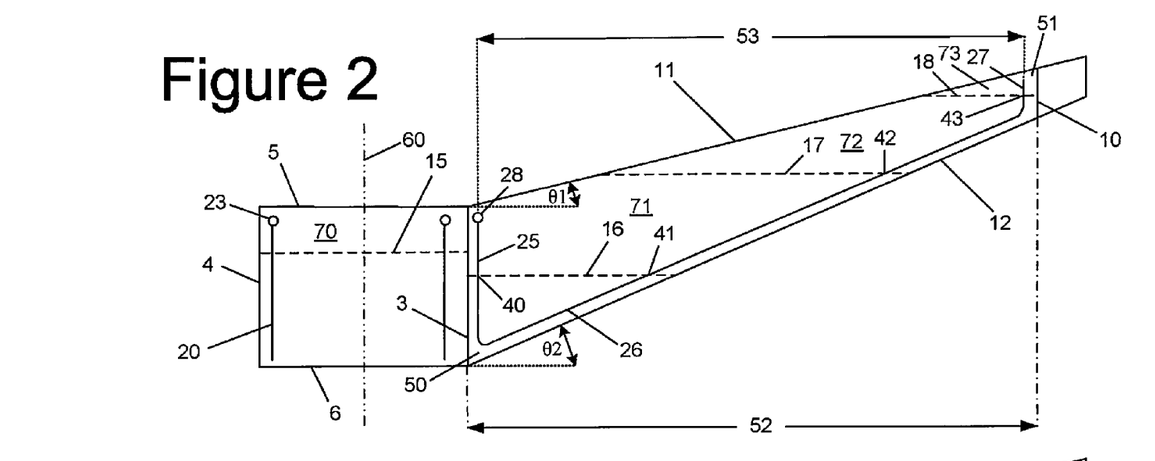
FIG. 2 is a front view of the system of FIG. 1.
Figure 3:
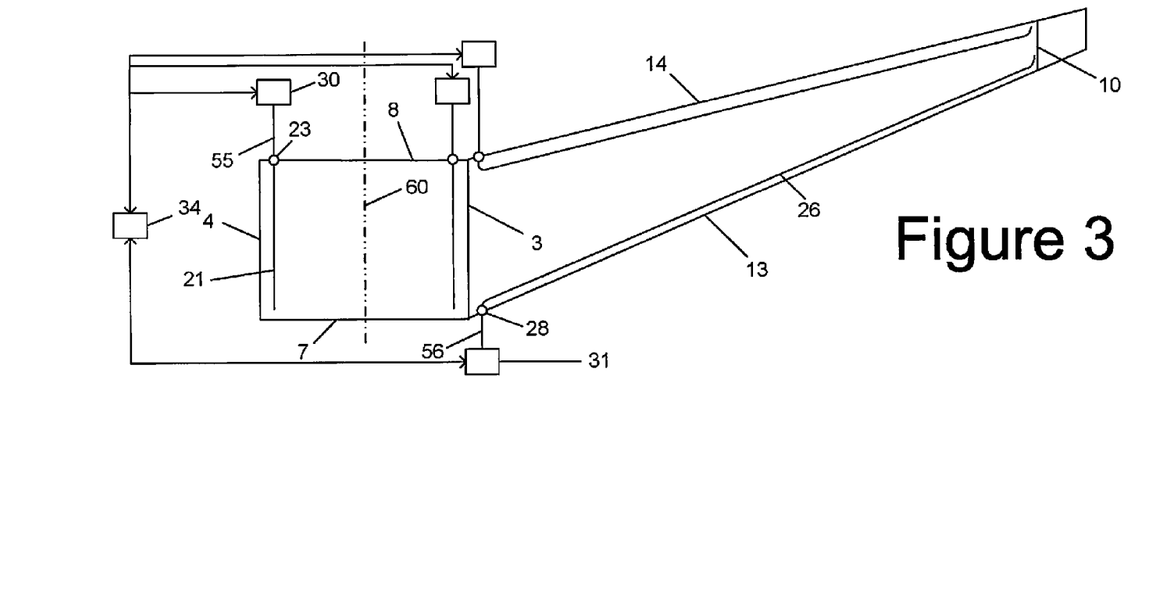
FIG. 3 is a plan view of the system of FIG. 1.

A fuel tank system shown in FIGS. 1-3 comprises a centre tank 1 and a port wing tank 2. Referring to FIGS. 2 and 3—the centre tank has port and starboard side walls 3,4; upper and lower walls 5,6; and fore and aft walls 7,8. Similarly the wing tank has inboard and outboard side walls 3,10; upper and lower walls 11,12; and fore and aft walls formed by spars 13,14. The system has a starboard wing tank which is a mirror image of the port wing tank and is not shown.

Figure 8:
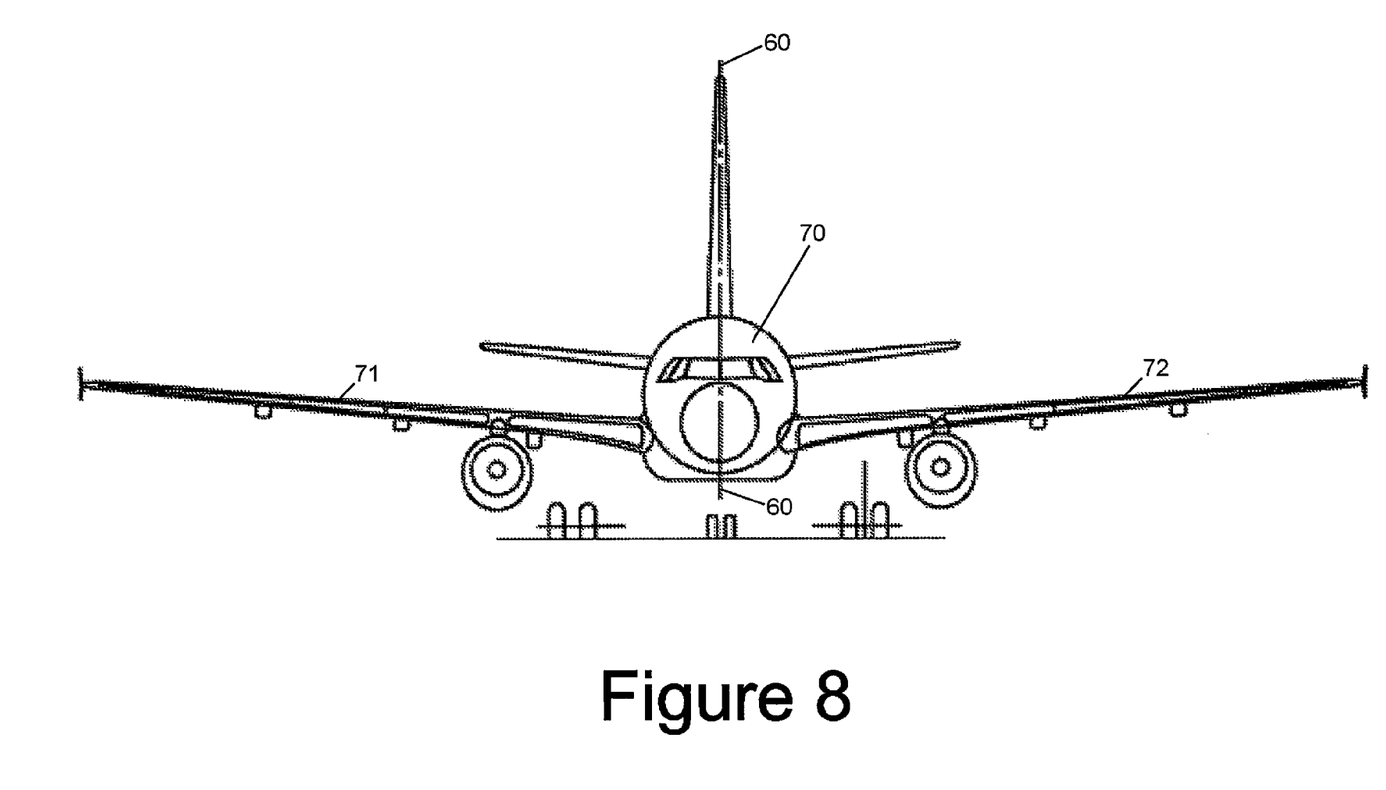
FIG. 8 is a front view of an aircraft comprising the first, second or third fuel system of FIGS. 1-7.
Figure 9:
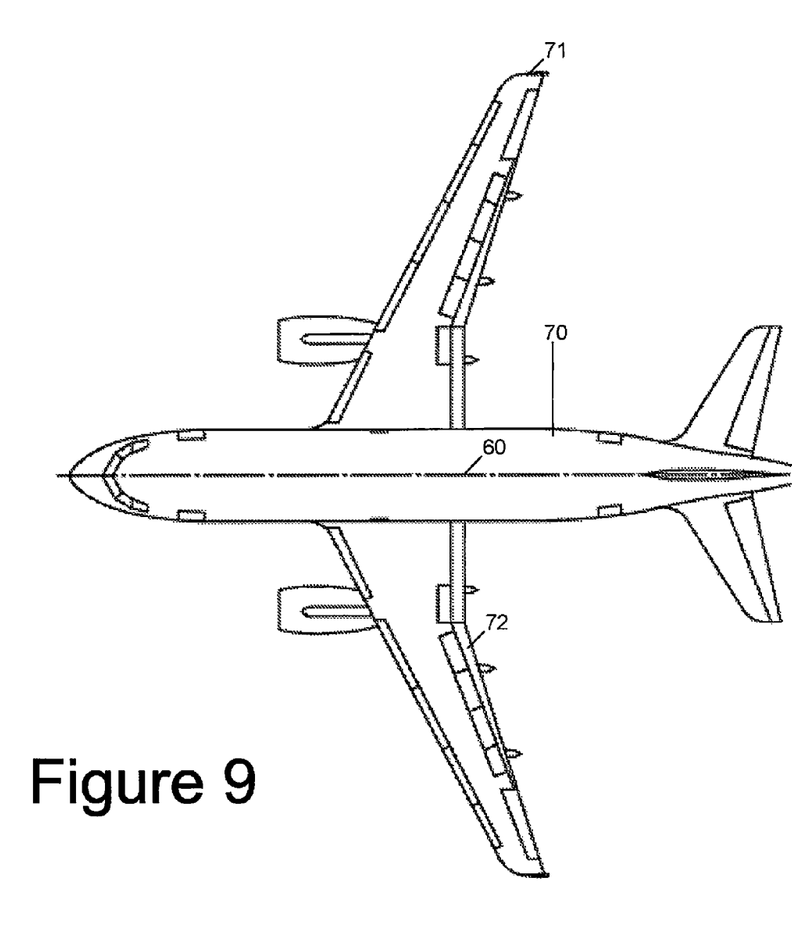
FIG. 9 is a plan view of the aircraft.
Figure 10:
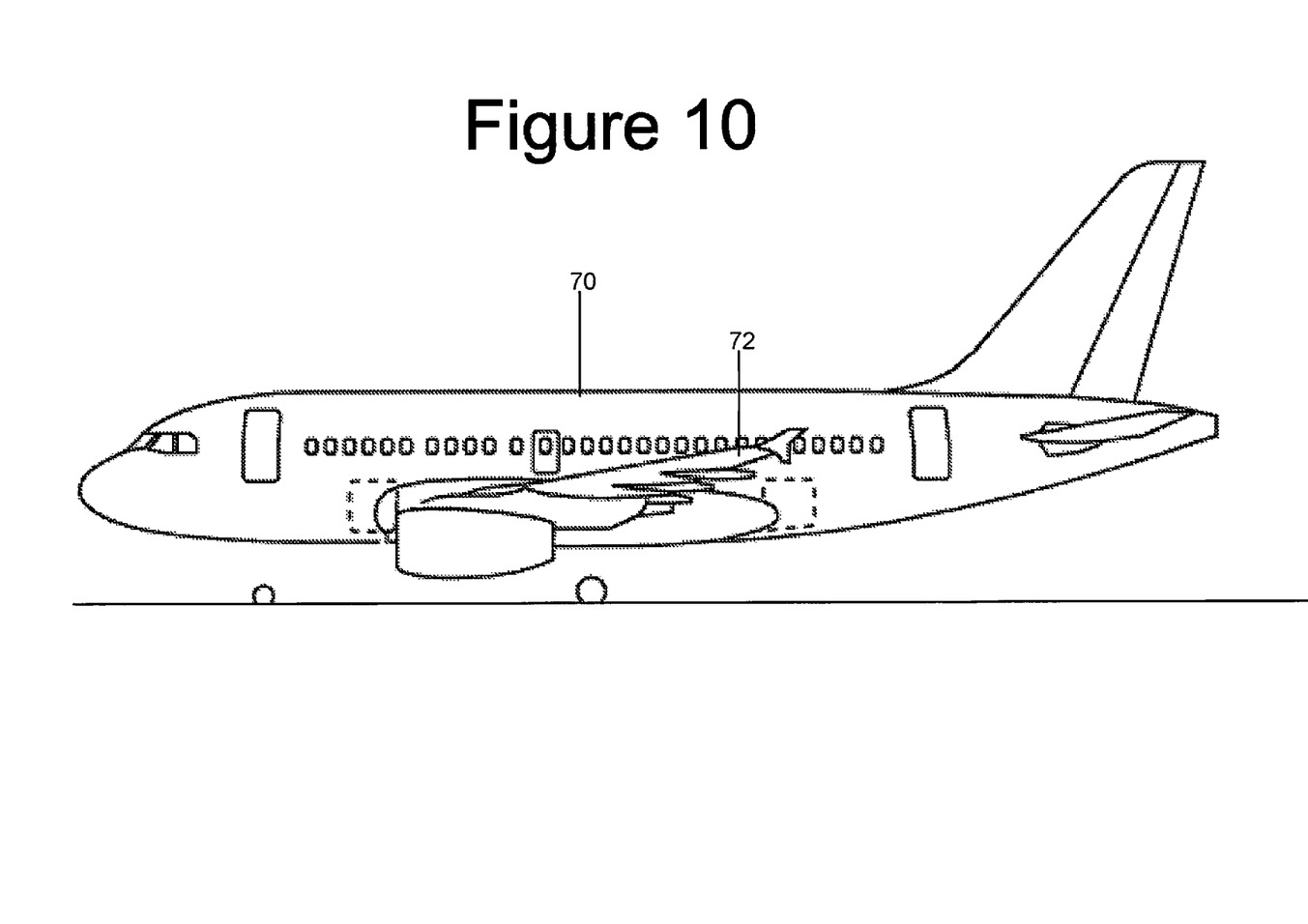
FIG. 10 is a port side view of the aircraft.

The system of FIG. 1-3 is part of an aircraft shown in FIGS. 8-10. The aircraft has a fuselage 70, a pair of wings 71,72, and a plane of symmetry 60.

The wing tank 2 forms the central part of the port wing 72, and is shown with an upward dihedral angle—in other words it is angled upwardly at an acute angle relative to a line normal to the plane of symmetry 60 as it extends away from the fuselage in an outboard direction. In FIG. 2 the dihedral angle of the upper wall 11 is labelled θ1 and the dihedral angle of the lower wall 12 is labelled θ2.

The dihedral angle of the wing tank 2 means that the low point 50 of the tank is at the inboard or root end of the wing tank, whereas the high point 51 of the tank is at the outboard or tip end of the wing tank, spaced apart horizontally from the low point 50 by the entire span 52 of the wing tank 2.

Each tank is filled and emptied independently. A single filling level 15 for the fuel in the centre tank is shown in FIG. 2 whereas three filling levels 16-18 for the fuel are shown for the wing tank.

Figure 5:
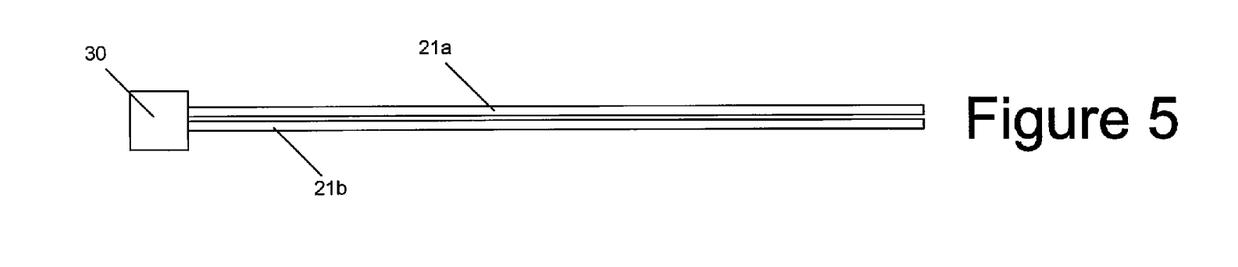
FIG. 5 is a schematic view of a double-wire cable.

Two time domain reflectometry (TDR) fuel gauges are installed in each fuel tank. Each TDR gauge comprises a signal generator and a cable which is within the fuel tank and coupled to the signal generator. Each cable may comprise a single copper wire (which may or may not have an insulating sheath) or a pair of wires 21a, 21b as shown in FIG. 5.

The centre tank 1 has one TDR gauge on the port side and the other on the starboard side. The starboard TDR gauge only will be described—the other TDR gauge being identical. The cable of the starboard TDR gauge has a proximal end 55 shown in FIG. 3 which passes through a connector 23 in the aft wall 8 and is connected to a signal generator 30. The cable has three cable parts 20, 21 and 22 within the tank which are coupled in series to the signal generator 30 via the proximal end 55. The aft cable part 20 extends vertically downwardly within the fuel tank away from the connector 23 and parallel with the plane of symmetry 60. The aft cable part 20 is mounted to the aft wall 8 by connectors (not shown). The cable then turns forward at a corner at the bottom of the tank leading to a bottom cable part 21 shown in FIG. 1 which extends forward and approximately parallel with the plane of symmetry 60 along the bottom wall 6 (to which it is attached by connectors—not shown). The cable then turns up to form a forward cable part 22 which extends vertically upwardly along the forward wall 7 to which it is attached by connectors (not shown) up to the distal end of the cable where the cable terminates.

The cable parts 20,22 are arranged such that for most filling levels of the fuel in the fuel tank (including the filling level 15 shown in FIG. 2) the cable part 20 extends down from an ullage space 70 into the fuel at an aft location and the cable part 22 extends up into the ullage space 70 out of the fuel at a forward location which is spaced apart horizontally from the first location by virtually the full fore-and-aft dimension of the centre tank 1.

Figure 4A:
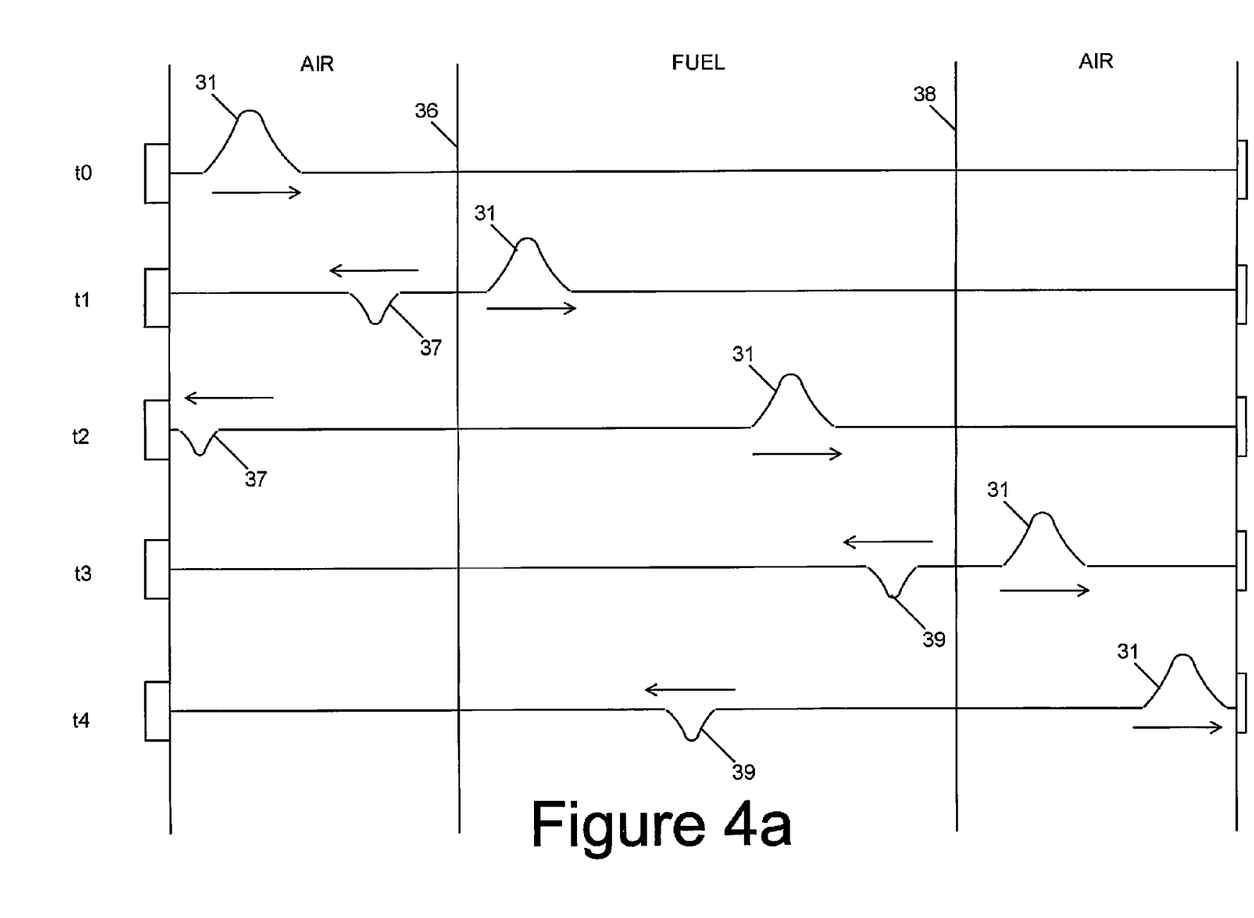
FIGS. 4a and 4b shows the signal pulses in the cable at times t0 to t7.
Figure 4B:
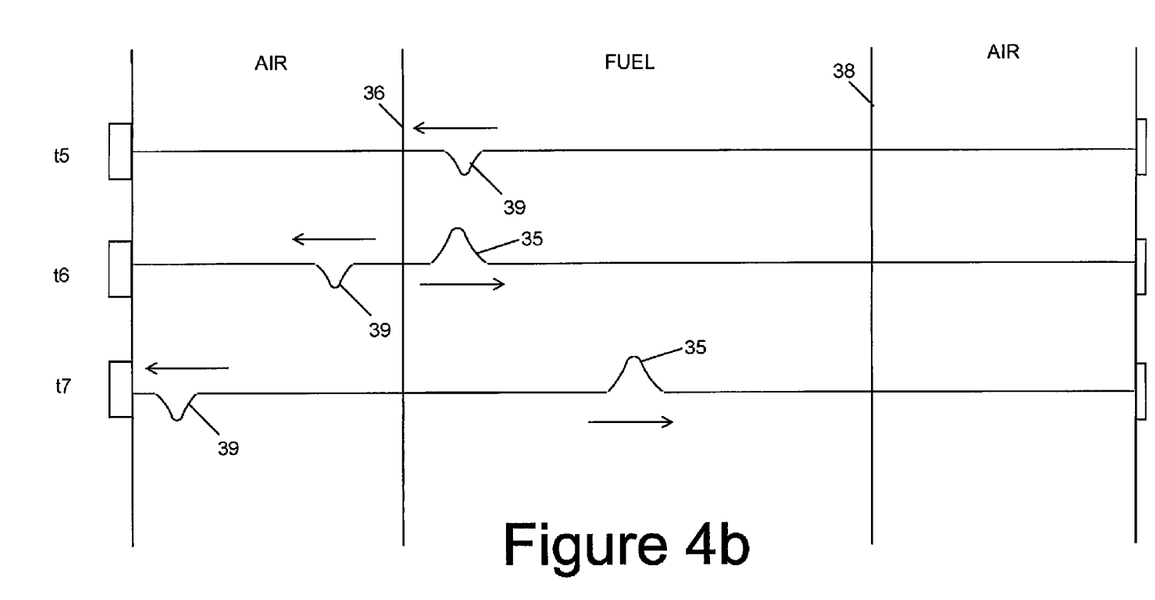

FIGS. 4a and 4b show the electrical pulses on the cable at times t0 to t7. The signal generator 30 generates an electrical input pulse 31 which is transmitted from the signal generator into the proximal end of the cable at time t0. A first reflected pulse 37 is generated at time t1 and received at time t2 from the air-to-fuel transition 36 where the aft cable part 20 extends down and into the fuel. A second reflected pulse 39 is generated at time t3 and received at time t7 from the fuel-to-air transition 38 where the forward cable part 22 extends up and out of the fuel.

The times of receipt t2, t7 of the first and second reflected pulses 37, 39 are then used by a signal processor 34 (shown in FIG. 3) to determine two estimates of the fuel level. For instance the processor 34 may obtain the two fuel level estimates by inputting the time differences (t2-t0) and (t7-t0) into a look-up-table.

As shown in FIG. 4b, a third reflected pulse 35 is also generated at the transition 36 at time t6 but this pulse is not processed. A further reflected pulse (now shown) may also be generated when the input pulse 31 reaches the end of the cable. This further reflected pulse may be attenuated by an attenuator (not shown) at the end of the cable.

The port gauge for the centre tank is identical to the starboard gauge described above, so between them the gauges generate four fuel level measurements, each associated with a time of receipt of a respective return pulse. The volume of fuel in the fuel tank is then determined by the signal processor 34 as follows.

To define a planar surface, three points of that surface are required. These three points should be located as far apart as possible to minimise the uncertainty in defining the surface. As mentioned above, the two gauges between them generate four fuel level measurements, which we can designate L1, L2, L3 and L4. If we take a subset of three of these level measurements (for instance L1, L2 and L3) then this defines a surface S1 which will depend on the volume of fuel in the tank as well as the pitch and roll of the aircraft relative to the horizontal. If we take another subset of three of these level measurements (for instance L1, L2 and L4) then this defines a surface S2. With the four measurements L1-L4 the processor 34 determines four surfaces S1-S4 in this way, and then determines a mean surface S(mean) which is the mean of these four surfaces S1-S4. The mean surface S(mean) is then input into a look-up-table which outputs the volume of fuel in the fuel tank for display to the pilot and/or storage for later analysis.

If one of the four level measurements is omitted or erroneous, then only a single surface S can be defined by the remaining three level measurements. In this case the surface S can still be input into the look-up-table which outputs the volume of fuel in the fuel tank, albeit with a lower accuracy than if four level measurements are available.

If two of the four level measurements are omitted or erroneous (for instance if one of the two TDR gauges in the fuel tank is broken) then a surface cannot be defined by the remaining two level measurements. In this case the processor 34 can use some other measurement to determine the pitch and roll of the aircraft and hence infer a surface which can be input into the look-up-table. For instance the processor 34 can take a surface S(wing) of the fuel in the wing tank and assume that the surface in the centre tank is parallel with S(wing). Thus with two level measurements from the centre tank the processor 34 can determine two surfaces which pass through those two levels and are parallel with S(wing), and enter the average of these surfaces into the look-up-table. Alternatively the processor 34 can receive inputs from attitude sensors which measure the pitch and roll of the aircraft, and use these with the two level measurements from the centre tank to determine two surfaces which pass through those two levels and are parallel with the pitch and roll axes of the aircraft, and enter the average of these surfaces into the look-up-table.

Finally—if three of the four level measurements are omitted or erroneous (for instance if one of the TDR gauges is broken) then a single surface can still be defined by the remaining single level measurement in combination with S(wing) and/or the attitude sensors and this single surface input into the look-up table.

In the embodiment of FIG. 1 each fuel gauge can only generate a maximum of two fuel level measurements for each filling level. However each cable could have a more complex undulating profile so that it passes through the fuel/ullage transition more than twice to give further measurements. In this case preferably the cable does not lie in a single plane, so the three or more fuel measurements can be used to define a surface of the fuel.

If a pool of water is present in the bottom of the centre tank and the cable passes through it, then two additional relatively weak reflected pulses will also be received between the first and second reflected pulses for each TDR gauge—one from the fuel to water transition and the other from the water to fuel transition. This enables the centre tank gauges to generate between them up to four water level measurements, each associated with a time of receipt of a respective return pulse. The water level can then determined by the signal processor 34 in accordance with one or all of these water level measurements.

The fuel gauge system for the wing tank 2 works along similar lines. The wing tank 2 also has two fuel gauges: one on the forward side and the other on the aft side. The forward gauge only will be described—the other gauge being identical. The cable of the forward gauge has a proximal end 56 which passes through a connector 28 in the forward spar 13 to a signal generator 31, and a distal end at the far end of the cable. The cable has three cable parts 25, 26 and 27 within the tank which are coupled in series to the signal generator 31 via the proximal end 56. The inboard cable part 25 extends vertically downwardly away from the connector 28 and parallel with the plane of symmetry 60. The inboard cable part 25 is mounted to the forward spar 13 by connectors (not shown). The cable then turns outboard at a corner near the low point 50 at the bottom of the tank and leads to a bottom cable part 26 which extends upwardly and laterally away from the plane of symmetry 60 at the dihedral angle θ2 along the bottom wall 12 (to which it is attached by connectors—not shown). The cable then turns up at a second corner to form a short outboard cable part 27 which extends vertically upwardly along the outboard wall 10 to which it is attached by connectors (not shown) up to the distal end of the cable. The distal end of the cable is near the high point 51 at the top of the tank. The cable and the wing tank each have a span 53,52 normal to the aircraft's plane of symmetry 60. In order to obtain readings for most filling levels, the span 53 of the cable is only slightly less than the span 52 of the wing tank—in this case the span 53 is about 95% of the span 52 of the wing tank.

The cable parts 25,26 are arranged such that for filling level 16 the inboard cable part 25 extends down from an ullage space 71 above the fuel and into the fuel at an inboard location 40 and the bottom cable part 26 extends up and out of the fuel into the same ullage space 71 at an outboard location 41 which is spaced apart from the inboard location by an amount which varies depending on the exact filling level.

For filling levels 17 and 18 the inboard cable part 25 is fully immersed so it does not pass through the upper surface of the fuel. For filling level 17 the bottom cable part 26 extends up and out of the fuel into an ullage space 72 at location 42. For filling level 18 the outboard cable part 27 extends vertically up and out of the fuel into an ullage space 73 at location 43.

The aft TDR gauge for the wing tank is identical to the forward gauge, so between them the two gauges can be used by the processor 34 to generate two or four fuel level measurements (depending on the fuel level) each associated with a time of receipt of a respective return pulse.

If four fuel levels are available then the processor 34 can calculate the volume of fuel in the wing tank using the same process as described above for the centre tank, but using a different look-up-table associated with the wing tank. If only one or two wing tank fuel levels are available, then one or two wing tank surfaces (and hence fuel volumes) can still be defined by these one or two wing tank level measurements in combination with the surface measured in the centre tank and/or the attitude sensors.

As with the centre tank, if a pool of water is present at the low point 50 in the bottom of the wing tank and the cable passes through it, then two additional relatively weak reflected pulses will also be received between the first and second reflected pulses for each TDR gauge—the first from the fuel to water transition and the second from the water to fuel transition. This enables the wing tank gauges to generate between them up to four water level measurements, each associated with a time of receipt of a respective return pulse. The water level can then determined by the signal processor 34 in accordance with one or all of these water level measurements.

Figure 6:
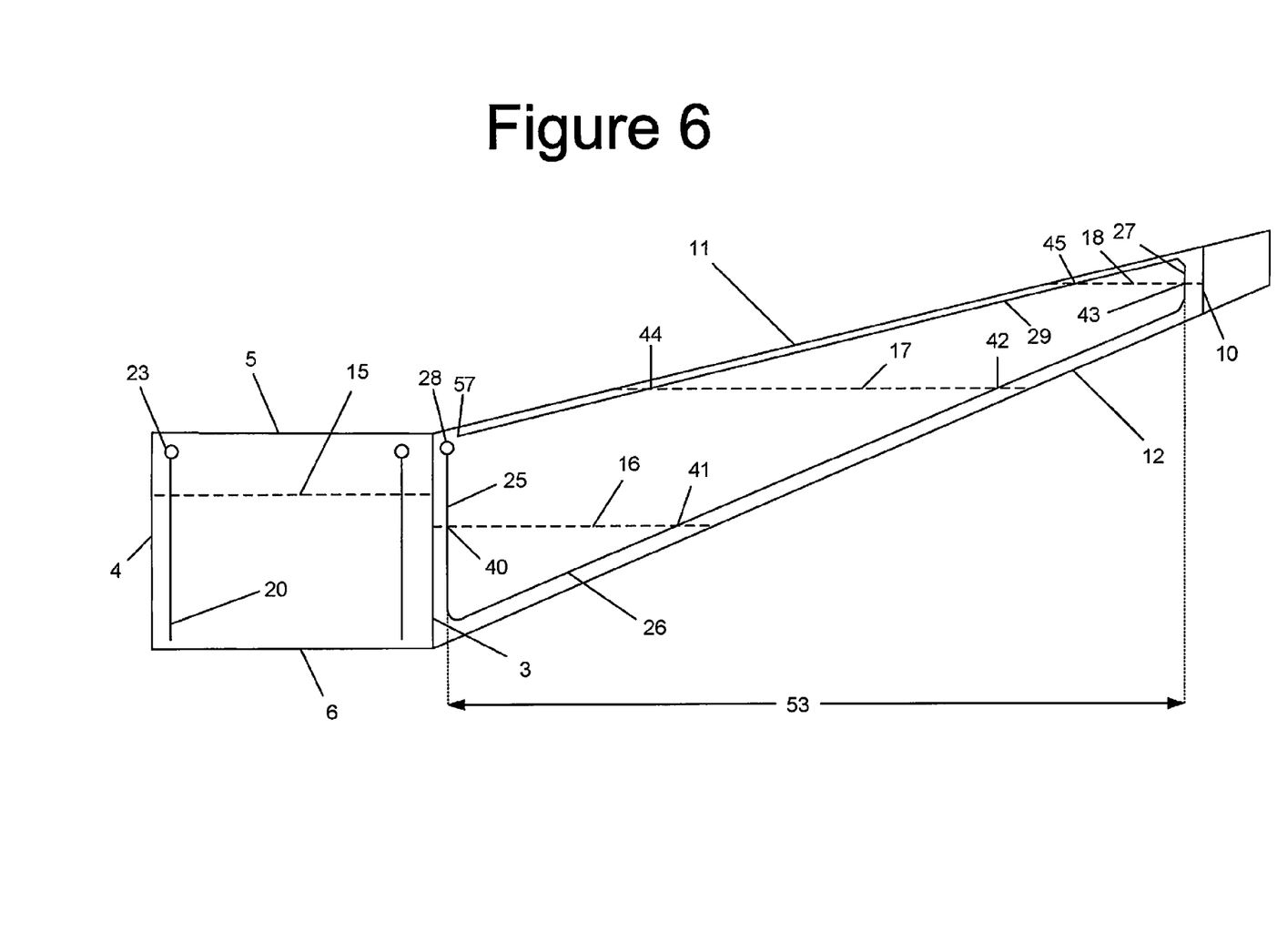
FIG. 6 is a front view of a second fuel tank system.

FIG. 6 shows a looped fuel gauge system for the wing tank 2 which generates four level measurements for most filling levels, in contrast to the system of FIGS. 1-3.

The system is similar to the one shown in FIGS. 1-3 so only the differences will be described. The outboard cable part 27 leads to a third corner where the cable turns inboard and runs downwardly and laterally at the dihedral angle θ1 via an upper cable part 29 along the upper wall 11 to which it is attached by connectors (not shown) up to the distal end 57 of the cable, which is close to the connector 28. The upper cable part 29 is in series with the other three cable parts 25-27 and the signal generator. As with the embodiment of FIG. 1 the span 53 of the cable is only slightly less than the span of the wing tank, as is the span of each individual cable part 26, 29.

For intermediate filling level 17 the upper cable part 29 extends down from the ullage space and into the fuel at location 44 and the lower cable part 26 extends up and out of the fuel into the ullage space at location 42. For upper filling level 18 the upper cable part 29 extends down from the ullage into the fuel at location 45 and the outboard cable part 27 extends vertically up and out of the fuel into the ullage space at location 43.

In the arrangement of FIG. 2, four fuel level measurements are only available for the relatively low fuel level 16. This is acceptable for normal flight operations since a high accuracy of fuel volume is only required when the fuel level is low. In contrast the arrangement of FIG. 6 can give a high level of accuracy for both high and low fuel levels.

Figure 7:
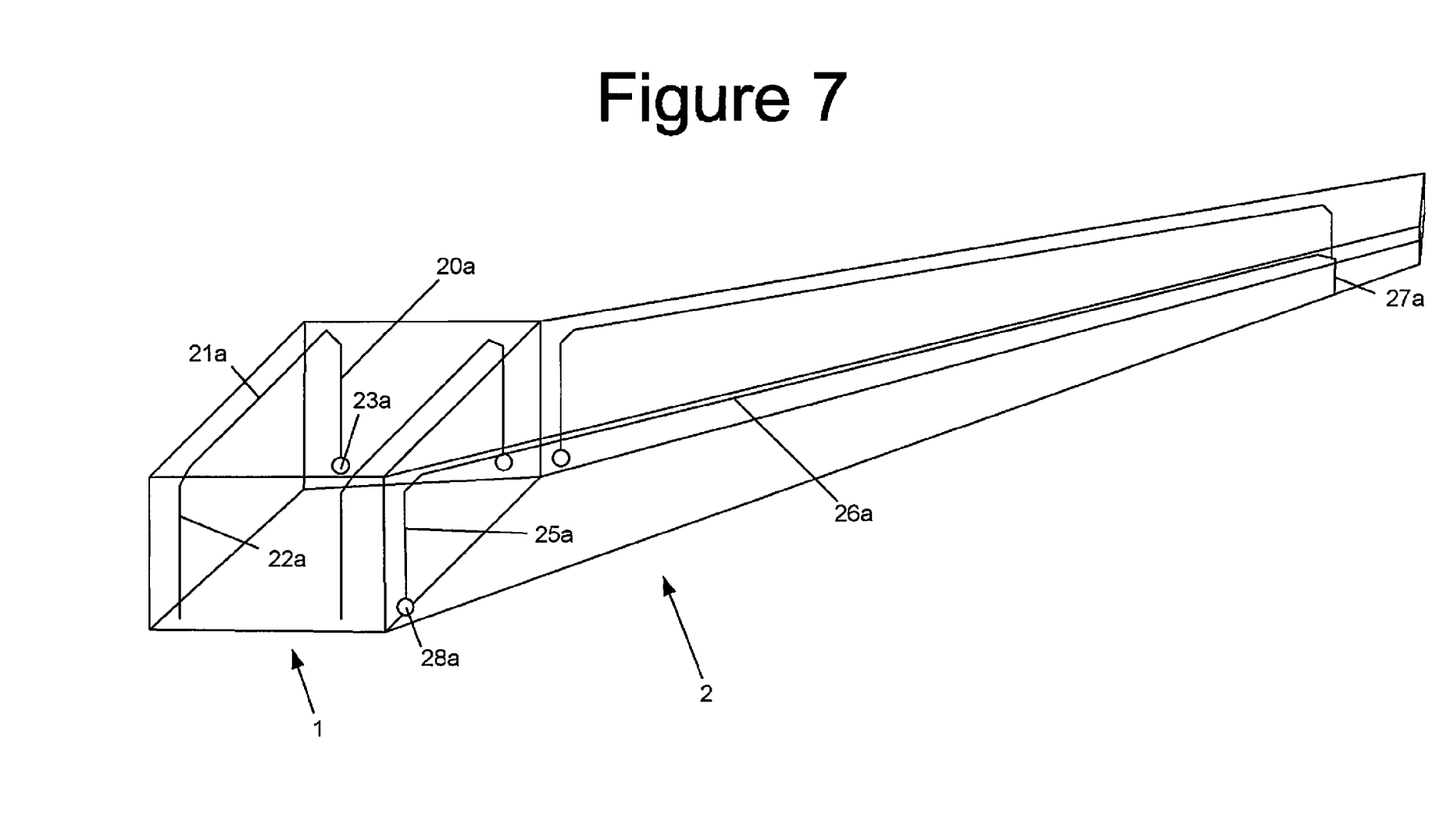
FIG. 7 is an isometric view of a third fuel tank system.

FIG. 7 shows a further alternative fuel gauge system which is similar to the one shown in FIG. 1 except it has been flipped so that the connectors are near the bottom of the fuel tank rather than the top.

The cable of the starboard gauge in the centre tank has a proximal end which passes through connector 23*a* in the aft wall 7 to a signal generator (now shown) and a distal end opposite the connector 23*a*. The cable has an aft cable part 20*a* which extends vertically upwardly within the fuel tank away from the connector 23*a* and parallel with the plane of symmetry 60. The aft cable part 20 is mounted to the aft wall 7 by connectors (not shown). The cable then turns forward at a corner at the top of the tank to a top cable part 21*a* which extends forward along the top wall 5 (to which it is attached by connectors—not shown) away from the corner. The cable then turns down to form a forward cable part 22*a* which extends vertically downwardly along the forward wall 8 to which it is attached by connectors (not shown) to the distal end of the cable at or near the bottom of the tank.

The fuel gauge system for the wing tank 2 is flipped in a similar way. The cable of the forward gauge has a proximal end which passes through connector 28*a* in the forward spar to a signal generator (not shown) and a distal end at an opposite end of the cable. The cable has an inboard cable part 25*a* which extends vertically upwardly within the fuel tank away from the connector 28*a*, which is near the low point of the wing tank. The inboard cable part 25*a* is mounted to the forward spar by connectors (not shown). The cable then turns outboard at a corner at the top of the tank and has a top cable part 26*a* which extends upwardly and laterally at the dihedral angle 91 along the top wall (to which it is attached by connectors—not shown) away from the corner. The cable then turns down near the high point to form an outboard cable part 27*a* which extends vertically down along the outboard wall 10 to which it is attached by connectors (not shown) up to the distal end of the cable.

When the tank is at filling level 18 the outboard cable part 27*a* extends down from the ullage space into the fuel and the upper cable part 26*a* extends up and out of the fuel into the same ullage space. For filling level 17 the top cable part 26*a* extends up and out of the fuel into the ullage space. For filling level 16 the inboard cable part 25*a* extends vertically up and out of the fuel into the ullage space.

Unlike the wing tank TDR gauges of FIG. 1, each wing tank TDR gauge in FIG. 7 can only generate a single water level reading.

As with FIG. 6 the cables in the wing tank of FIG. 7 can be extended along the lower wall to return the cable close to the connector 28*a* almost completing a full loop and allowing four measurements for most fuel filling levels. This will also enable each cable to generate two water level readings if the distal end of the cable is sufficiently close to the low point of the wing tank.

From the measured fuel level the fuel volume (and hence fuel mass) in each tank can be inferred by the processor 34 and displayed to the pilot and/or stored in a computer memory for later analysis. Technically only one TDR probe per tank is required (in combination with pitch and roll sensors) but two are preferred for purposes of redundancy, accuracy and health checking of the system.

Similarly the water level may be calculated as mentioned above and displayed to the pilot and/or stored in a computer memory. Alternatively the further reflected pulse(s) from the water/fuel transition may simply be used to indicate the presence of water—the system generating an output which may be a visual alert for the pilot or a water indicator which is stored in a computer memory for later analysis.

Although the invention has been described above with reference to one or more preferred embodiments, it will be appreciated that various changes or modifications may be made without departing from the scope of the invention as defined in the appended claims.

The invention claimed is:

1. An aircraft fuel tank system comprising an aircraft fuel tank;
   and a time domain reflectometry (TDR) fuel gauge installed in the aircraft fuel tank for measuring a filling level of fuel in the aircraft fuel tank, the TDR fuel gauge comprising an electromagnetic signal generator and a cable, the cable comprising a first cable part a second cable part and a third cable part which are coupled in series to the signal generator, wherein:
   the first cable part extends downwardly within the fuel tank and the second cable part extends upwardly within the fuel tank;
   the first and second cable parts are arranged such that for at least one filling level of the fuel in the fuel tank the first cable part extends down into the fuel from an ullage space at a first location and the second cable part extends up out of the fuel into an ullage space at a second location which is spaced apart from the first location; and
   the fuel tank has two opposite side walls and an upper or lower wall extending between the side walls, and each of the first, second and third cable parts of the cable runs substantially along the length of a respective one of the two opposite side walls and the upper or lower wall.

2. The system of claim 1 wherein the first and second cable parts are arranged such that for the at least one filling level the first cable part extends at an acute angle to the horizontal at the first location where it extends down into the fuel and/or the second cable part extends at an acute angle to the horizontal at the second location where it extends up out of the fuel.

3. The system of claim 1 wherein the first cable part runs substantially along the length of respective one of the two opposite side walls of the fuel tank and the second cable part runs substantially along the length of the other of the two opposite side walls or to the upper or lower wall of the fuel tank.

4. The system of claim 3 wherein the second cable part runs substantially along the length of the other of the two opposite side walls of the fuel tank.

5. The system of claim 3 wherein the second cable part runs substantially along the length of the upper or lower wall of the fuel tank, which is adjacent to the respective one of the two opposite side walls of the fuel tank, which it meets at a corner.

6. The system of claim 1 wherein the three cable parts of the cable are attached to the two opposite side walls and to the upper or lower wall.

7. The system of claim 1 wherein the cable further comprises a fourth cable part in series with the signal generator and the first, second and third cable parts of the cable; and the four cable parts of the cable each run along a respective one of the two opposite side walls and the upper and lower walls.

8. The system of claim 1 further comprising a processor arranged to determine a time of receipt of reflected electromagnetic pulses received from the first and second cable parts.

9. The system of claim 1 comprising a further TDR fuel gauge installed in the aircraft fuel tank for measuring a filling level of fuel in the aircraft fuel tank, the further TDR fuel gauge comprising an electromagnetic signal generator and a cable, the cable comprising a first cable part and a second cable part which are coupled in series to the signal generator, wherein the first cable part extends downwardly within the fuel tank and the second cable part extends upwardly within the fuel tank, wherein the first and second cable parts are arranged such that for at least one filling level of the fuel in the fuel tank the first cable part extends down into the fuel from an ullage space at a third location and the second cable part extends up out of the fuel into an ullage space at a fourth location which is spaced apart from the third location, and wherein the third and fourth locations are each spaced apart from the first and second locations.

10. The system of claim 9 wherein the TDR fuel gauge and the further TDR fuel gauge collectively generate three or more fuel level measurements which define a surface which will depend on a volume of fuel in the tank as well as a pitch and roll of the tank relative to the horizontal, and the system further comprises a processor arranged to estimate the volume of fuel in the tank in accordance with the three or more fuel level measurements.

11. An aircraft comprising a system according to claim 1.

12. The aircraft of claim 11 wherein the fuel tank is a wing tank in a wing of the aircraft.

13. The aircraft of claim 12 wherein the aircraft has a plane of symmetry and at least part of the cable within the wing tank extends away from the plane of symmetry.

14. The aircraft of claim 13 wherein the cable and the wing tank each have a span normal to the plane of symmetry, and the span of the cable is more than 70% of the span of the wing tank.

15. The aircraft of claim 13 wherein the wing tank along with the first and/or second cable part is angled upwardly or downwardly as it extends away from the plane of symmetry.

16. The aircraft of claim 11 wherein the fuel tank has a forward wall and an aft wall, relative to the forward motion of the aircraft, and wherein each TDR fuel gauge passes through the forward wall or the aft wall.

17. A method of measuring a filling level of fuel in an aircraft fuel tank with a time domain reflectometry (TDR) fuel gauge, the TDR fuel gauge comprising a signal generator and a cable, the cable comprising a first cable part a second cable part and a third cable part which are coupled in series to the signal generator, wherein the fuel tank has two opposite side walls and an upper or lower wall extending between the side walls, and each of the first, second and third cable parts of the cable runs substantially along the length of a respective one of the two opposite side walls and the upper or lower wall, the method comprising transmitting an input electromagnetic pulse from the signal generator into the cable; receiving a first reflected electromagnetic pulse from the first cable part where it extends down into the fuel from an ullage space at a first location; receiving a second reflected electromagnetic pulse from the second cable part where it extends up out of the fuel into an ullage space at a second location, and determining a time of receipt of the first and second reflected electromagnetic pulses.

18. The method of claim 17 further comprising receiving a further reflected electromagnetic pulse from the cable where it passes through a transition between water and fuel; and determining a time of receipt of the further reflected electromagnetic pulse.

19. The method of claim 17 further comprising estimating a volume of the fuel in the fuel tank in accordance with the time of receipt of the first and second reflected electromagnetic pulses.

20. A method according to claim 17 for measuring a filling level of fuel in an aircraft fuel tank with the time domain reflectometry (TDR) fuel gauge and a further TDR fuel gauge, the further TDR fuel gauge comprising a signal generator and a cable, the cable comprising a first cable part and a second cable part which are coupled in series to the signal generator, the method comprising for each TDR fuel gauge transmitting an input electromagnetic pulse from the signal generator into the cable; receiving a first reflected electromagnetic pulse from the first cable part where it extends down into the fuel from an ullage space at a third location; receiving a second reflected electromagnetic pulse from the second cable part where it extends up out of the fuel into an ullage space at a fourth location, and determining a time of receipt of the first and second reflected electromagnetic pulses, wherein the TDR fuel gauge and the further TDR fuel gauges collectively generate three or more fuel level measurements which define a surface which will depend on a volume of fuel in the tank as well as a pitch and roll of the tank relative to the horizontal, and the method further comprises estimating the volume of fuel in the tank in accordance with the three or more fuel level measurements.

* * * * *